United States Patent Office 3,001,981
Patented Sept. 26, 1961

3,001,981
OIL-SOLUBLE METAL SULFONATES AND PROCESS FOR THE PREPARATION THEREOF
William M. Le Suer, Cleveland, Ohio, assignor to The Lubrizol Corporation, Wickliffe, Ohio, a corporation of Ohio
No Drawing. Filed Nov. 30, 1959, Ser. No. 855,983
9 Claims. (Cl. 260—139)

This application is a continuation-in-part of application Ser. No. 657,737, filed May 8, 1957 and now U.S. 2,915,517 which in turn was a continuation-in-part of application Ser. No. 466,237, filed November 1, 1954 and now abandoned.

This invention relates to novel compositions and to methods for the preparation of same. In a more particular consideration it relates to a method of sulfonation and the subsequent modification of the sulfonated products thereof.

The commercial use of organic sulfonates has increased at a rapid rate in the last several years. Among the factors entering into this increase use has been the particular utility of these sulfonates, either per se in lubricants or in the preparation of other detergents for use in lubricants. The performance characteristics of sulfonates in mineral lubricating compositions has been such that they comprise a very large proportion of all detergents which are so used. With the wide popular acceptance of heavy duty motor oils which contain large amounts of detergents it will be seen that this is indeed a considerable factor.

As is so often the case in such situations where a commodity is suddenly in great and increasing demand the organic sulfonates have frequently been in critically short supply and there has been much effort directed to the problem of increasing or extending this supply.

It is accordingly a principal object of this invention to provide a process by means of which the supply of organic sulfonates can be extended.

It is also an object of the present invention to provide a process for the preparation of novel derivatives of sulfonic acids.

It is still further an object of this invention to provide lubricating compositions which contain the above novel compositions dispersed therein.

Other objects will be apparent from the following description.

The above objects are accomplished by the process of preparing oil-soluble metal sulfonates containing relatively large amounts of metal which comprises the reaction of a neutral oil-soluble metal salt selected from the class consisting of alkaline earth metal and alkali metal salts of phosphorus- and chlorine-containing acids prepared by the reaction of a chlorinated substantially aliphatic olefin polymer with phosphorus trichloride and phosphorus-containing acids prepared by the reaction of a substantially aliphatic olefin polymer with phosphorus and a sulfur halide, with a sulfonating agent to form an acidic metal salt, and treatment of said acidic metal salt with a stoichiometrically excessive amount of an inorganic basically reacting compound selected from the class consisting of alkali metal compounds and alkaline earth metal compounds in the presence of a promoter selected from the class consisting of phenolic compounds, alcohols, aliphatic nitro compounds, and oximes.

The neutral-metal oil-soluble salts of the above process include as indicated the alkaline earth metal and alkali metal salts of certain acids. The terms "alkaline earth metal" and "alkali metal" are used in their usual sense to designate calcium, barium, magnesium and strontium, and lithium, sodium and potassium respectively. The anion of these oil-soluble metal salts contains phosphorus and in many cases also contains chlorine. The phosphorus- and chlorine-containing anions, or acids from which the metal salts are prepared, are derived from the reaction of a chlorinated substantially aliphatic olefin polymer with phosphorus trichloride. The product from such a reaction contains reactive chlorine which is particularly susceptible to hydrolysis to yield phosphorus- and chlorine-containing acids which can be used for the preparation of the neutral oil-soluble metal salts of the above process. The chlorine-containing substantially aliphatic olefin polymer is prepared ordinarily by reaction of chlorine and a polyolefin such as polyethylene or polyisobutylene. The latter has been used most in the process because of its ready availability and also because of the particular effectiveness of the product of the process of this invention when polyisobutylene is used for such purpose.

The chlorination of these substantially aliphatic polymers is accomplished most efficiently simply by bubbling chlorine through the polymer either with or without a solvent. Such treatment may be continued until the desired degree of chlorination is achieved.

The relative amounts of reactants used in the reaction of the chlorinated olefin polymer with phosphorus trichloride is related to the reactivity of the chlorine in the polymer chain with the phosphorus trichloride. The amount of phosphorus trichloride used should be within the range of from about 0.25 to 2.0 moles per atom of chlorine in the chlorinated olefin polymer. It is preferred to use an amount of phosphorus trichloride near the upper range of this ratio, although the reason for this is based solely upon economy. A principal purpose of the process is the incorporation of phosphorus into the product, and the chlorine in the polymer chain serves merely to aid in this incorporation of chlorine. Thus the chlorinated polyolefin ordinarily will contain a minimum amount of chlorine (for reasons of economy) with respect to this function, viz., the incorporation of phosphorus into the product. The apparent maximum effectiveness of the chlorine in serving such purpose is reflected by this upper limit of the ratio of phosphorus trichloride to chlorine, i.e., 2:1. The use of a larger amount of phosphorus trichloride than indicated by this ratio results in a product having no more phosphorus than that obtained by the use of two moles of phosphorus trichloride per atom of chlorine in the polymer chain. Similarly the use of less phosphorus chloride than indicated by this ratio of 2:1, while in no way detrimental to the reaction of the process, indicates the presence in the polylmer molecule of more chlorine than is needed to aid in the incorporation of a maximum quantity of phosphorus.

Polyolefins of virtually all molecular weights are usable in the process. That is to say the presence of chlorine in any polyolefin serves to activate the polyolefin with respect to its reactivity with phosphorus trichloride. As a practical matter, however, it has been noted that those polyolefins having molecular weights within the broad range of from about 350 to about 50,000 are most useful. Polyolefins having molecular weight lower than 350 do not seem to be benefited nearly so much by the presence of chlorine in their molecular structure (for the purpose of this invention) as do the higher molecular weight polymers. At the other end of the range of molecular weight it has been noted that chlorinated polyolefins having a molecular weight greater than 50,000, while reactive to produce useful products, are less reactive than the lower molecular weight chlorinated polyolefins and correspondingly less satisfactory for the purposes of this invention.

As to the identity of the chlorinated polyolefin it is preferred to utilize the chlorinated polymers derived from ethylene, propylene and isobutylene. Other monomers may be copolymerized with any one of these three lower molecular weight olefins, but in every case such a copolymer must be composed predominantly of ethylene, propylene or isobutylene units. The other copolymerizable monomers include styrene, n-butene, cyclohexene, m-chlorostyrene, etc.

The reaction conditions of the process involve merely mixing the reactants and heating the mixture, usually with agitation, at a temperature in excess of about 130° C. It will be noted that this minimum reaction temperature exceeds that of the boiling point of phosphorus trichloride. For this reason it is necessary to mix the reactants by adding the phosphorus trichloride portionwise to the chlorinated polyolefin, and to provide means for the return of unreacted, volatilized phosphorus trichloride to the reaction mixture. As a practical matter it is preferred to add the phosphorus trichloride through a tube extending beneath the surface of the liquid reaction mixture, thus insuring intimate contact and maximum reaction of the two reactants. Ordinarily the temperature of the reaction mixture is within the range of 150–225° C.; as indicated earlier the process may be carried out at temperatures as low as about 130° C.; somewhat higher temperatures may be employed, within the limits of the thermal stability of the reactants and product. There seems to be no advantage in carrying the reaction out at temperatures higher than about 250° C., and in this light a practical operating range of temperature for this step of the process may be considered as extending from about 130° C. to about 250° C.

The intermediate product available from the above-described step contains phosphorus and chlorine; much of the chlorine is loosely bonded to the polymeric chain and is quite susceptible to hydrolysis. For the purposes of this invention a substantial proportion of such loosely bonded chlorine is removed in the second step of the process. This removal of chlorine is effected by heating with a chlorine-reactive agent selected from the class consisting of water, hydrogen sulfide, alcohols, phenolic compounds, mercaptans, amides, formaldehyde, epoxides, amines, alkaline earth metal hydroxides, and inorganic carbonates. Preferably this step is effected by means of steam at temperatures of the order of 100–160° C. The intermediate product is heated to 150° C. for example whereupon steam is blown through the mass. The treatment with steam is continued until all of the unstably bonded chlorine is removed, and in most cases one hour of such treatment is sufficient to accomplish this result. The hydrolysis may alternatively be carried out by adding water to the intermediate product and then heating the mixture to 80–150° C. to effect the hydrolysis. The product which results from this step contains an appreciable amount of chlorine ranging from 0.1% upward; it will be seen that the upper limit of such chlorine content is determined largely by the chlorine content of the chlorinated polymer used as a starting material.

As for the phosphorus-containing acids prepared by the reaction of a substantially aliphatic olefin polymer with phosphorus and a sulfur halide, here again it is preferred to use polymers prepared from ethylene, propylene and butylenes. Again, because of the commercial availability of polymers of isobutylene and also because of their particular efficacy in the process, these polymers are preferred. Copolymers of these monomers are useful and these include as illustrative examples copolymers of ethylene and styrene, propylene and isoprene, isobutylene and butadiene, etc. In every case such copolymers should contain a predominant proportion of an aliphatic monomer. Thus if the copolymer contains styrene units these should be present only in small or insignificant amounts. This polymeric reactant may be of low or high molecular weight. The range extends from as low as 350 up to 100,000 and higher. Especially preferred are polyisobutylenes in the higher molecular weight range, viz., from 40,000 up to 100,000. The molecular weights referred to herein are based upon viscosity determinations as outlined in copending application Serial No. 816,078, filed May 27, 1959. The sulfur halide is generally sulfur monochloride although others such as sulfur dichloride and the corresponding bromides likewise are contemplated as within the scope of this invention.

The reaction of the aliphatic polymer with phosphorus and sulfur halide involves simply mixing these three reactants and heating to a temperature within the range of from about 100° C. to about 250° C. The resulting product then is hydrolyzed, usually with steam to produce an acidic material. The steam-treatment step generally is carried out within the range of 100–200° C.

The preparation of the neutral oil-soluble metal salts of this process from the above-described phosphorus acids is accomplished most simply by reaction of these acids with the corresponding metal oxide or hydroxide. The acid and metal compound are mixed and heated, usually in the presence of a small amount of water which later is removed by heating.

The further reaction of these metal salts with a sulfonating agent to form an acidic metal salt as described above is the first step in the process of this invention. The sulfonating agent used in the process may be any of the ordinarily used sulfonating materials, viz., oleum, concentrated sulfuric acid, sulfur trioxide, chlorosulfonic acid, the various complexes of sulfur trioxide, etc. Of these, for reasons of economy and convenience of reaction, it is preferred to use chlorosulfonic acid.

In view of the exothermic nature of the reaction of the process it is advisable to carry out the process by adding one of the reactants to the other in a portionwise fashion. A particularly convenient method is the portionwise addition of the sulfonating agent to the oil-soluble metal salt, or to a solution of the metal salt. The temperature of the sulfonation is conveniently within the range of 0°–200° C. Preferably the temperature is maintained at some relatively constant temperature between 25° C. and 125° C. As indicated previously, the sulfonation is exothermic and little or no additional heat is required to maintan a temperature of, for example, 60°–80° C.

When chlorosulfonic acid is used as the sulfonating agent the sulfonation reaction is accompanied by a copious evolution of hydrogen chloride, and because of the tendency for some of this evolved hydrogen chloride to remain dissolved in the reaction mixture, it is advisable to flush the sulfonation mass with some inert gas, such as nitrogen, etc.

The product directly obtainable from the sulfonation of an oil-soluble metal salt is an acidic material and as such is of value as an intermediate in the preparation of normal and basic metal salts. The preparation of a basic salt can be accomplished by any of several methods previously disclosed in U.S. 2,501,731, 2,402,325, 2,485,-861, 2,616,924, 2,617,049, 2,619,460, as well as in copending application, U.S. Ser. No. 483,177, filed January 20, 1955. Thus the acidic product which is available from the process of this invention may be treated with the stoichiometric amount of a basically reacting metal compound required to produce the normal salt, or it may be so treated with more than this amount in which case a basic metal salt will be obtained. In the latter case the incorporation into the product of metal in excess of the stoichiometric amount required to neutralize the acidity of the sulfonation product may be assisted by promoters, high temperature, etc. as disclosed in the previously mentioned patents.

As basically reacting metal compounds which may be used to prepare either the normal or basic salts it is preferred to use oil-insoluble metal compounds. These include principally the inorganic compounds such as the oxides, hydroxides, carbonates, etc. and the lower molecular weight alcoholates such as methylates, butylates, etc.

Of these particular preference exists for the inorganic, basically reacting metal compounds.

Other valuable products which may be formed from these acidic sulfonate salts include the neutral compositions which contain considerably more metal than that required merely to neutralize the acidity of the sulfonated salts. Such neutral compositions may be obtained by treating the acidic sulfonated salt with a stoichiometric excess of a metal oxide or hydroxide and then treating this basic mass with an acidic gas such as carbon dioxide, sulfur dioxide, hydrogen sulfide, etc. This latter process may be carried out in the presence of a promoter such as tautomeric compound (phenols, enols, aci-nitro compounds, etc.) as disclosed in the previously mentioned patents, or an alcohol.

In this latter instance, i.e., where such a basic mass contains a tautomeric promoter it will be desirable to use an acidic gas which has an ionization constant greater than that of the promoter.

Such "tautomeric" promoters include specifically the above phenolic compounds, aci-nitro compounds, oximes, and in general any compound having an enolizable hydrogen. Thus acetyl acetone, acetoacetic ester and phenyl acetone are illustrative examples of such enolic compounds. The phenols are illustrated specifically by phenol itself, butyl phenol, the various octyl phenols, wax-substituted phenols, chlorophenols, nitrophenols, α-naphthol and the various substituted naphthols. The aci-nitro compounds include principally the nitroparaffins, nitropropane, nitrobutane, etc. The nitrated waxes are also useful as promoters. The oximes include acetone oxime, butyraldehyde oxime, p-amyl phenylacetaldehyde oxime, etc.

Other very useful promoters include the alcohols. Both monohydric and polyhydric alcohols are effective. Methanol is commonly used because of its economic availability and also because of its ease of removal from the process mixture when the process has been completed. Other low molecular weight alcohols are similarly useful for the same reasons. When it is unnecessary to remove the alcohol from the product of the process and the higher molecular weight alcohols can be used with some advantage. Thus the octyl alcohols and glycols have been found to be quite effective in promoting this reaction.

The amount of promoter used should be within the broad range of from about 0.1 mole to about 10.0 equivalents per equivalent of sulfonated metal salt.

The invention is illustrated in greater detail by the following examples.

Example 1

To 785 pounds of chlorinated polyisobutylene having a chlorine content of 4.5% and an average molecular weight of about 800 there was added at 110° C. 138 pounds of phosphorous trichloride. The addition was made portionwise and the temperature of the reaction mixture rose to 188° C. during this step. The mixture was heated for an additional 14 hours at 178–199° C. and then blown with nitrogen at about 170° C./38 mm. Steam was then blown through the product at 160° C. for 4 hours and this steam-blown material then dried by bubbling nitrogen therethrough at the same temperature for 30 minutes. The resulting acidic material was characterized as follows:

Acid number, 38 (to phenolphthalein)
0.4% chlorine
2.0% phosphorus

To a mixture of 2,440 grams (1.6 equivalents) of the above phosphorus- and chlorine-containing acid dissolved in 510 grams of mineral oil there was added 50 grams of water and 123 grams (1.6 equivalents) of barium oxide. This mixture was heated at 150° C. for 1 hour, then cooled to 85° C. and treated portionwise over a period of 1.5 hours with 233 grams (2.0 equivalents) of chlorosulfonic acid. The temperature of the mixture was maintained at 85–95° C. throughout the addition of the chlorosulfonic acid. Nitrogen was bubbled through the mixture for 2 hours at this temperature and the product found to have the following analysis:

Acid number, 46 (to phenolphthalein)
1.5% phosphorus
3.3% barium
0.5% chlorine

To the above barium salt there was added 180 grams of water, 1,978 grams of mineral oil and 336 grams (4.4 equivalents) of barium oxide. To this stirred mixture there was added 492 grams (2.4 equivalents) of heptyl phenol and then an additional 1,053 grams (13.8 equivalents) of barium oxide. This mixture then was heated to 150° C., blown with carbon dioxide to approximate neutrality, diluted further with 830 grams of mineral oil and finally filtered through a siliceous filter aid. The filtrate was a clear brown liquid characterized by the following analysis:

0.6% sulfur
0.6% phosphorus
26.4% sulfate ash

Example 2

To 504 pounds of chlorinated polyisobutylene having a chlorine content of 4.3% and an average molecular weight of about 800 there was added portionwise at 154–160° C. throughout a period of 5.5 hours 89 pounds of phosphorus trichloride. When all of the phosphorus trichloride had been added 17.5 pounds of water was added portionwise over a period of 5 hours. The resulting mixture then was heated for an additional 4 hours at 160° C. and then for 1 more hour at 160° C./30 mm. Steam was blown through this mixture for 2 hours at the same temperature, and then nitrogen for another 2 hours to remove the last traces of moisture. The dried product showed the following analysis:

Acid number, 73 (to phenolphthalein)
0.4% chlorine
3.0% phosphorus

To a mixture of 28 pounds of water, 200 pounds of mineral oil and 43 pounds (0.56 equivalent) of barium oxide there was added at 70–85° C. 200 pounds of the above acid. The addition was made over a period of 2 hours and the resulting mixture was heated for an additional 30 minutes at about 85° C. The mixture then was heated to 150° C. and blown with nitrogen to remove the water. The dry mixture was filtered and the neutral salt found to contain the following:

1.3% phosphorus
6.6% barium

To 1,450 grams (0.6 equivaent) of the above neutral barium salt there was added portionwise throughout a period of 1 hour 88 grams (0.75 equivalent) of chlorosulfonic acid, the temperature being maintained at 75° C. The product was diluted with 500 grams of mineral oil and then blown with nitrogen for 2 hours. To this acidic material there was added 570 grams of mineral oil, 184 grams (0.9 equivalent) of heptyl phenol and 100 grams of water. This mixture was heated to 70° C. whereupon 510 grams (6.7 equivalents) of barium oxide was added. The temperature was raised to 150° C. and carbon dioxide was bubbled through the mixture until it was slightly acidic. This acidic filtrate was filtered through a siliceous filter aid and the filtrate found to have the following analysis:

0.2% chlorine
0.5% phosphorus
25.0% sulfate ash

Example 3

To 1,000 pounds of chlorinated polyisobutylene having a chlorine content of 4.3% and an average molecular weight of about 800 there was added at 96° C. 110 pounds of phosphorus trichloride over a period of 40 minutes. To this reaction product there was added 61 pounds of heptyl phenol at 90–96° C., the addition requiring 1 hour. This mixture was heated to 200° C. over a period of 4 hours and then an additional 110 pounds of phosphorus trichloride added portionwise throughout a 6-hour period. After 2 more hours of heating at this temperature nitrogen was bubbled through the mixture at 170–187° C./50 mm. The residue was characterized by the following analysis:

2.0% chlorine
2.2% phosphorus

The above product was blown with steam at 160° C. for 2 hours and then with nitrogen at this same temperature for another 2 hours. To 1,640 grams (1.24 equivalents) of this steam-blown material there was added 25 grams of water, 500 grams of mineral oil and 105 grams (1.37 equivalents) of barium oxide. This mixture was heated to 150° C. to remove water and then filtered through a siliceous filter aid. The filtrate was characterized by the following analysis:

0.2% chlorine
1.6% phosphorus
4.0% barium
8.3% sulfate ash

A solution of 1,011 grams (0.53 equivalent) of the above neutral barium salt in 200 grams of mineral oil was maintained at 70–85° C. while 80 grams (0.69 equivalent) of chlorosulfonic acid was added portionwise throughout a period of 1 hour. The chlorosulfonated product was diluted with 665 grams of mineral oil and blown with nitrogen for 1.5 hours. Heptyl phenol (107 grams, 0.56 equivalent), water (65 grams) and barium oxide (443 grams, 5.8 equivalents) were added and the mixture heated to 150° C. Carbon dioxide was bubbled through at this temperature until the mixture was slightly acidic; it then was filtered through a siliceous filter aid to yield a clear filtrate having the following analysis:

0.3% chlorine
0.75% sulfur
0.65% phosphorus
26.0% sulfate ash

Example 4

To a solution of 600 grams of polyisobutylene having an average molecular weight of 10,000 in 600 grams of mineral oil there was added 25 grams (0.8 mole) of yellow phosphorus and then portionwise 10.8 grams (0.8 mole) of sulfur monochloride. The mixture was maintained at 26–29° C. in an atmosphere of nitrogen until the last of the sulfur monochloride had been added and then heated for 4 hours at 200° C. The reaction was exothermic. The product was treated with steam at 160° C. for 4 hours and then dried by an additional hour of heating at this temperature. The steam-treated product was filtered through a siliceous filter aid. The filtrate was found to have the following analysis:

Acid number, 43 (to phenolphthalein)
1.54% phosphorus
0.99% sulfur
0.25% chlorine The above acidic product was neutralized with barium oxide by heating a mixture of 886 grams of the product in 594 grams of mineral oil with 40 grams of water and 71 grams of barium oxide. After heating for 2 hours at 150° C. the neutralized mixture was filtered through a siliceous filter aid to yield a clear brown liquid filtrate having the following analysis:

Acid number, 0.4 (to phenolphthalein)
0.87% phosphorus
3.73% barium

To 1,115 grams of the above barium salt there was added portionwise at 70–80° C. 48 grams (0.4 mole) of chlorosulfonic acid. Nitrogen then was blown through the reaction mixture at this same temperature for 30 minutes. The resulting product was mixed with 1,144 grams of mineral oil, 90 grams of heptyl phenol, 28 grams of water and 265 grams (3.2 equivalents) of barium oxide. This mixture was heated to 150° C. and then treated with carbon dioxide until it was substantially neutral. It was then filtered to yield a brown filtrate having the following analysis:

0.54% sulfur
0.31% phosphorus
7.57% barium

Example 5

To a solution of 750 grams of polyisobutylene having an average molecular weight of 800 in 750 grams of mineral oil there was added at room temperature 27 grams of yellow phosphorus. The mixture was purged with nitrogen and then treated dropwise at room temperature with 179 grams of sulfur monochloride. The addition required 1.3 hours. The mixture then was heated at 165° C. for 4 hours and then blown with steam for 2 hours at 140–155° C. This steam-blown product was dried by bubbling nitrogen therethrough at 140–155° C. To 965 grams (1.0 equivalents) of this steamed material in 700 grams of mineral oil there was added 50 grams of water and 90 grams (1.17 equivalents) of barium oxide. This mixture was heated to 150° C. with agitation and then filtered. The filtrate was characterized by the following analysis:

0.88% phosphorus
4.0% barium

To 710 grams (0.2 equivalent) of this neutralized acid there was added portionwise at 70–80° C. 31 grams (0.27 equivalent) of chlorosulfonic acid. The resulting product was diluted in 151 grams of mineral oil and then treated with 45 grams of tertiary butyl phenol, 20 grams of water and 170 grams (2.2 equivalents) of barium oxide. This mixture was heated to 150° C. and then blown with carbon dioxide until it was substantially neutral. The thus neutralized mixture was filtered and the filtrate found to have the following analysis:

0.5% phosphorus
1.2% sulfur
14.1% barium

Example 6

To 783 pounds of chlorinated polyisobutylene having a chlorine content of 4.0% and an average molecular weight of about 800 there was added simultaneously and portionwise over a period of 11 hours at 154–200° C., 110 pounds of phosphorus trichloride and 27 pounds of hydrogen sulfide. The resulting mixture was heated at 200° C./50 mm. for 2 hours and then blown with nitrogen at this same temperature for another 2 hours. The material then was treated with steam at 150° C. for 6 hours and then dried by bubbling nitrogen therethrough at this same temperature. The product had the following analysis:

Acid number, 34 (to phenolphthalein)
0.5% chlorine
1.5% sulfur
2.1% phosphorus

A mixture of 2,380 grams of the above acid, 1,000 grams of mineral oil and 100 grams of water was heated to 70° C. and then 180 grams (2.35 equivalents) of barium oxide added. The mixture was heated to 150° C. to remove water and then filtered through a siliceous filter aid. The filtrate showed the following analysis:

0.5% chlorine
    0.9% sulfur
    1.3% phosphorus
    3.7% barium
    7.4% sulfate ash To 466 grams (0.2 equivalent) of the above neutral barium salt there was added portionwise at 70–80° C. 31 grams (0.26 equivalent) of chlorosulfonic acid. After nitrogen had been bubbled through the mixture at this temperature for a brief period 341 grams of mineral oil, 27 grams (0.3 equivalent) of 1-nitropropane, 25 grams of water and 170 grams (2.2 equivalents) of barium oxide were added. The resulting mixture was heated to 150° C. and then blown with carbon dioxide until it was neutral. The neutral product was filtered and the filtrate characterized by the following analysis:

0.6% chlorine
    1.0% sulfur
    0.5% phosphorus
    7.4% barium
    13.0% sulfate ash

*Example 7*

To 933 grams (0.4 equivalent) of the neutral barium salt of Example 6 there was added portionwise at 75–85° C. 61 grams (0.53 equivalent) of chlorosulfonic acid. When all of the chlorosulfonic acid was added nitrogen was bubbled through the mixture at the same temperature for 30 minutes. The chlorosulfonated product then was diluted with 372 grams of mineral oil and 50 grams of water, 54 grams (0.6 equivalent) of 1-nitropropane and 340 grams (4.4 equivalents) of barium oxide added. The resulting mixture then was heated to 150° C. and blown with carbon dioxide to neutrality. The mixture then was filtered and the filtrate found to have the following analysis:

0.4% chlorine
    1.1% sulfur
    0.7% phosphorus
    9.8% barium
    17.0% sulfate ash

*Example 8*

To 652 grams (0.28 equivalent) of the neutral barium salt of Example 6 there was added portionwise over a period of 1 hour at 75–85° C. 43 grams (0.37 equivalent) of chlorosulfonic acid. The chlorosulfonated product was blown with nitrogen at 80° C. for 1 hour, then diluted with 450 grams of mineral oil and 30 grams of water and 38 grams (0.5 equivalent) of barium oxide added. To this stirred mixture there was added 65 grams (0.43 equivalent) of isophorone oxime and 200 grams (2.6 equivalents) of barium oxide, and the mixture heated to 150° C. Carbon dioxide was bubbled through the mixture until it was slightly acidic and then the mixture was filtered through a siliceous filter aid. The clear filtrate showed the following analysis:

0.4% chlorine
    0.95% sulfur
    0.60% phosphorus
    14.4% barium
    24.6% sulfate ash

*Example 9*

To 1,190 grams (1.0 equivalent) of the phosphorus- and chlorine-containing acid of Example 6, diluted with 500 grams of mineral oil, there was added 100 grams of water and 47 grams (1.2 equivalents) of sodium hydroxide. This mixture was heated to 150° C. and held at that temperature for 3 hours to remove the water. The resulting sodium salt solution then was filtered through a siliceous filter aid to yield a clear brown liquid filtrate having the following analysis:

0.5% chlorine
    1.0% sulfur
    1.3% phosphorus
    1.2% sodium
    4.8% sulfate ash To 940 grams (0.4 equivalent) of the above sodium salt there was added at 75° C. 61 grams (0.5 equivalent) of chlorosulfonic acid over a period of 45 minutes. After all of the chlorosulfonic acid had been added the product was blown with nitrogen for 1 hour and then diluted with 437 grams of mineral oil. To this solution there was added 100 grams of a 50% aqueous sodium hydroxide solution, then 115 grams (0.6 equivalent) of heptyl phenol and finally an additional 256 grams (4.4 equivalents in all) of the 50% aqueous sodium hydroxide solution. This mixture was heated to 150° C. to remove water whereupon carbon dioxide was bubbled through the mixture until it was slightly acidic. Filtration through a siliceous filter aid yielded a clear brown liquid having the following analysis:

0.2% chlorine
    0.9% sulfur
    0.7% phosphorus
    3.9% sodium
    11.5% sulfate ash

*Example 10*

A solution of 1,190 grams (1.0 equivalent) of the chlorine- and phosphorus-containing acid of Example 6 in 500 grams of mineral oil was treated with a solution of 68 grams (1.6 equivalents) of lithium hydroxide monohydrate in 250 grams of water and heated to 180° C. When no more water would distill the mixture was filtered and the fitlrate characterized by the following analysis:

0.5% chlorine
    1.4% phosphorus
    0.4% lithium
    3.9% sulfate ash

Chlorosulfonic acid (92 grams, 0.79 equivalent) was added portionwise to 694 grams (0.75 equivalent) of the above lithium salt heated at 70–80° C. At the conclusion of the reaction the mixture was purged with nitrogen and then diluted with 760 grams of mineral oil. To this oil solution there was added 92 grams (0.48 equivalent) of heptyl phenol, 100 grams of water and 213 grams (5.1 equivalents) of lithium hydroxide monohydrate. This mixture was heated to 150° C., treated with carbon dioxide until neutral and then filtered. The product was characterized by the following analysis:

0.3% chlorine
    0.6% sulfur
    0.6% phosphorus
    5.6% sulfate ash

*Example 11*

The calcium salt of the chlorine- and phosphorus-containing acid of Example 6 was prepared by reacting 1,190 grams (1.0 equivalent) of that acid in 500 grams of mineral oil with 44 grams (1.2 equivalents) of calcium hydroxide in the presence of 100 grams of water. The neutralization was effected by heating this mixture to 150° C. and maintaining this temperature for 3 hours to drive off water. The mixture then was filtered through a siliceous filter aid and the filtrate found to have the following analysis:

0.6% chlorine
    0.9% calcium
    1.0% sulfur
    1.4% phosphorus
    3.8% sulfate ash The above calcium salt was sulfonated by portionwise treatment of 730 grams (0.3 equivalent) of the salt with 49 grams (0.4 equivalent) of chlorosulfonic acid at 70–80° C. After purging with nitrogen the product was diluted with 847 grams of mineral oil and then treated with 150 grams of water, 134 grams (3.6 equivalents) of calcium hydroxide and 681 grams (7.2 equivalents) of phenol. This mixture was heated at reflux temperature for 2 hours and then dried by heating at 150° C. The dried mixture was blown with carbon dioxide at 150° C. and then filtered. The filtrate had the following analysis:

- 0.3% chlorine
- 0.9% sulfur
- 0.6% phosphorus
- 3.3% calcium
- 11.0% sulfate ash

*Example 12*

The strontium salt of the chlorine- and phosphorus-containing acid of Example 6 was prepared in the usual manner, i.e., heating a mixture of approximately equivalent amounts of the acid and strontium oxide in the presence of water. The resulting strontium salt was characterized by the following analysis:

- 0.5% chlorine
- 1.0% sulfur
- 1.4% phosphorus
- 2.8% strontium
- 6.3% sulfate ash This strontium salt (920 grams, 0.4 equivalent) was sulfonated by treatment with 61 grams (0.5 equivalent) of chlorosulfonic acid at 70–80° C. The sulfonated product was purged with nitrogen, diluted with 467 grams of mineral oil and then treated with 100 grams of water, 300 grams (4.8 equivalents) of ethylene glycol and 231 grams (4.4 equivalents) of strontium oxide. This mixture was heated to 150° C., then blown with carbon dioxide until it was substantially neutral. Filtration yielded a clear liquid having the following analysis:

- 0.3% chlorine
- 1.1% sulfur
- 0.8% phosphorus
- 7.8% strontium
- 16.6% sulfate ash

*Example 13*

To 750 pounds of polyisobutylene having an average molecular weight of 750 there was added portionwise and simultaneously throughout a period of 7.2 hours 138 pounds of phosphorus trichloride, 34 pounds of hydrogen sulfide and 71 pounds of chlorine. The mixture was maintained at about 200° C. throughout this period and when all of these reactants had been added the mixture was heated for an additional 3.5 hours at 190° C./120 mm., nitrogen being bubbled through the mixture for the latter 2 hours of this period. The mixture then was treated with steam at 150° C. for 11 hours and finally purged with nitrogen. The resulting acid showed the following:

- Acid number, 54 (to phenolphthalein)
- 0.7% chlorine
- 0.9% sulfur
- 1.9% phosphorus The barium salt of the above chlorine- and phosphorus-containing acid was prepared by mixing and heating approximately equivalent amounts of the acid and barium oxide in the presence of water. The barium salt was characterized by the following analysis:

- 0.4% chlorine
- 1.1% phosphorus
- 4.0% barium
- 7.3% sulfate ash

Sulfonation of the above barium salt was accomplished by adding 49 grams (0.4 equivalent) of chlorosulfonic acid portionwise at 70–80° C. to 955 grams (0.4 equivalent) of the barium salt. The sulfonated salt then was purged with nitrogen, diluted with 204 grams of mineral oil and treated with 185 grams (3.6 equivalents) of strontium oxide and 670 grams (7.1 equivalents) of phenol. This mixture was heated to 150° C. and blown with carbon dioxide at this temperature to substantial neutrality. The thus carbonated mixture was filtered and the filtrate found to have the following analysis:

- 0.4% chlorine
- 0.4% phosphorus
- 4.7% strontium
- 1.2% barium
- 12.4% sulfate ash The products of the above-described processes and other processes within the scope of this invention are useful in lubricating compositions intended for use in the crankcases of internal combustion engines employed either under conditions of high speed and high temperature as well as under conditions of stop-and-go driving, idling, low speed, etc.

The efficacy of such lubricating compositions is shown by the results of engine tests carried out in accordance with U.S. Army Ordnance tentative specification AXS–1551. This test is known as the Caterpillar CRC–L–1 Engine Test and a particular test illustrating the quality of the product of the process of this invention is a modification of that test, the modification consisting of the use of a fuel having a sulfur content of 1% (significantly higher than that of the specified fuel). An SAE 10 oil containing 1.56% of the product of Example 3, 1.72% of an amine salt of an alkyl-substituted maleic acid, 0.8% of a zinc dialkyl phosphorodithioate and 3 parts per million of a dimethyl silicone foam inhibitor was subjected to the conditions of this engine test. After 480 hours of use the "top ring groove filling" rating was 8% and the overall piston cleanliness rating was 97.0 (on a scale ranging from 0 as poor to 100.0 as perfectly clean). These results are very good and sufficient to merit a "pass" rating.

Other modes of applying the principle of the invention may be employed, change being made as regards the details described, provided the features stated in any of the following claims, or the equivalent of such be employed.

I therefore, particularly point out and distinctly claim as my invention:

1. The process of preparing oil-soluble metal sulfonates containing relatively large amounts of metal which comprises the reaction of a neutral oil-soluble metal salt selected from the class consisting of alkaline earth metal and alkali metal salts of acids selected from the class consisting of phosphorus- and chlorine-containing acids prepared by the reaction of a chlorinated substantially aliphatic olefin polymer with phosphorus trichloride and phosphorus-containing acids prepared by the reaction of a substantially aliphatic olefin polymer with phosphorus and a sulfur halide, with a sulfonating agent selected from the class consisting of oleum, concentrated sulfuric acid, sulfur trioxide, chlorosulfonic acid, and complexes of sulfur trioxide to form an acidic metal salt, and treatment of said acidic metal salt with a stoichiometrically excessive amount of an inorganic basically reacting compound selected from the class consisting of alkali metal compounds and alkaline earth metal compounds in the presence of a promoter selected from the class consisting of phenolic compounds, alcohols, aliphatic nitro compounds, and oximes.

2. The process of claim 1 characterized further in that the substantially aliphatic olefin polymer is a polymer of isobutylene.

3. The process of claim 1 characterized further in that the substantially aliphatic olefin polymer is a homopolymer of isobutylene.

4. The process of claim 1 characterized further in that the substantially aliphatic olefin polymer is a homopolymer of isobutylene having an average molecular weight of from about 40,000 to about 100,000.

5. The process of claim 1 characterized further in that the inorganic basically reacting compound is an alkaline earth metal base.

6. The process of claim 1 characterized further in that the promoter is a phenolic compound.

7. The process of preparing oil-soluble alkaline earth metal sulfonates containing relatively large amounts of metal which comprises the reaction of an alkaline earth metal salt of a phosphorus- and chlorine-containing acid prepared by the reaction of a chlorinated homopolymer of isobutylene with phosphorus trichloride, with a sulfonating agent selected from the class consisting of oleum, concentrated sulfuric acid, sulfur trioxide, chlorosulfonic acid, and complexes of sulfur trioxide to form an acidic metal salt, and treatment of said acidic metal salt with a stoichiometrically excessive amount of a basically reacting alkaline earth metal compound in the presence of a phenolic compound.

8. The process of claim 1 characterized further in that the sulfonating agent is chlorosulfonic acid.

9. The process of claim 7 characterized further in that the sulfonating agent is chlorosulfonic acid.

No references cited.